United States Patent
Samuel et al.

(10) Patent No.: US 11,392,493 B2
(45) Date of Patent: Jul. 19, 2022

(54) SYSTEM AND METHOD FOR OPTIMIZING NON-VOLATILE RANDOM ACCESS MEMORY USAGE

(71) Applicant: DELL PRODUCTS, LP, Round Rock, TX (US)

(72) Inventors: Balasingh P. Samuel, Round Rock, TX (US); Vivek Viswanathan Iyer, Austin, TX (US)

(73) Assignee: Dell Products L.P., Round Rock, TX (US)

(*) Notice: Subject to any disclaimer, the term of this patent is extended or adjusted under 35 U.S.C. 154(b) by 146 days.

(21) Appl. No.: 16/884,566

(22) Filed: May 27, 2020

(65) Prior Publication Data

US 2021/0374054 A1    Dec. 2, 2021

(51) Int. Cl.
*G06F 12/06* (2006.01)
*G06F 12/02* (2006.01)
*G06F 9/4401* (2018.01)

(52) U.S. Cl.
CPC ........ *G06F 12/0646* (2013.01); *G06F 9/4401* (2013.01); *G06F 12/0253* (2013.01); *G06F 2212/1044* (2013.01)

(58) Field of Classification Search
CPC ............. G06F 12/0646; G06F 12/0253; G06F 2212/1044; G06F 9/4401
See application file for complete search history.

(56) References Cited

U.S. PATENT DOCUMENTS

| | | | |
|---|---|---|---|
| 7,302,542 B1* | 11/2007 | Cantrill | G06F 12/023 711/170 |
| 7,558,804 B1* | 7/2009 | Polydov | G06F 9/445 |
| 2003/0229767 A1* | 12/2003 | Lee | G06F 11/2092 711/154 |
| 2007/0214135 A1* | 9/2007 | Crivat | G06F 16/2465 |
| 2009/0300265 A1* | 12/2009 | Vyssotski | G11C 16/349 711/100 |
| 2015/0370653 A1* | 12/2015 | Scott | G06F 9/4411 714/19 |
| 2019/0278508 A1* | 9/2019 | Pepper | G06F 3/0652 |
| 2019/0332468 A1 | 10/2019 | Chaiken et al. | |
| 2020/0073568 A1 | 3/2020 | Chaiken et al. | |
| 2020/0073676 A1* | 3/2020 | Liu | G06F 3/0656 |

* cited by examiner

*Primary Examiner* — Michael Krofcheck
(74) *Attorney, Agent, or Firm* — Larson Newman, LLP

(57) ABSTRACT

An information handling system includes a non-volatile memory (NVRAM) and a processor. The NVRAM stores a plurality of NVRAM variables and a basic input/output system (BIOS) of the information handling system. The BIOS includes system BIOS variable services. The processor executes the system BIOS variable services. While executing the system BIOS variable services, the processor determines whether a holding area of a first NVRAM variable of the NVRAM variables is completely used. In response to the storage being completely used, the processor calculates a new size of the holding area based on metadata of the first NVRAM variable, and creates a new storage area for the first NVRAM variable. The size of a second holding area of the new storage area equals the new size.

17 Claims, 10 Drawing Sheets

SYSTEM AND METHOD FOR OPTIMIZING NON-VOLATILE RANDOM ACCESS MEMORY USAGE

FIELD OF THE DISCLOSURE

The present disclosure generally relates to information handling systems, and more particularly relates to optimizing non-volatile random access memory usage in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes a non-volatile random access memory (NVRAM) and a processor. The NVRAM stores a plurality of NVRAM variables and a basic input/output system (BIOS) of the information handling system. The BIOS includes system BIOS variable services. The processor executes the system BIOS variable services. While executing the system BIOS variable services, the processor determines whether a holding area of a first NVRAM variable of the NVRAM variables is completely used. In response to the storage being completely used, the processor calculates a new size of the holding area based on metadata of the first NVRAM variable, and creates a new storage area for the first NVRAM variable. The size of a second holding area of the new storage area equals the new size.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
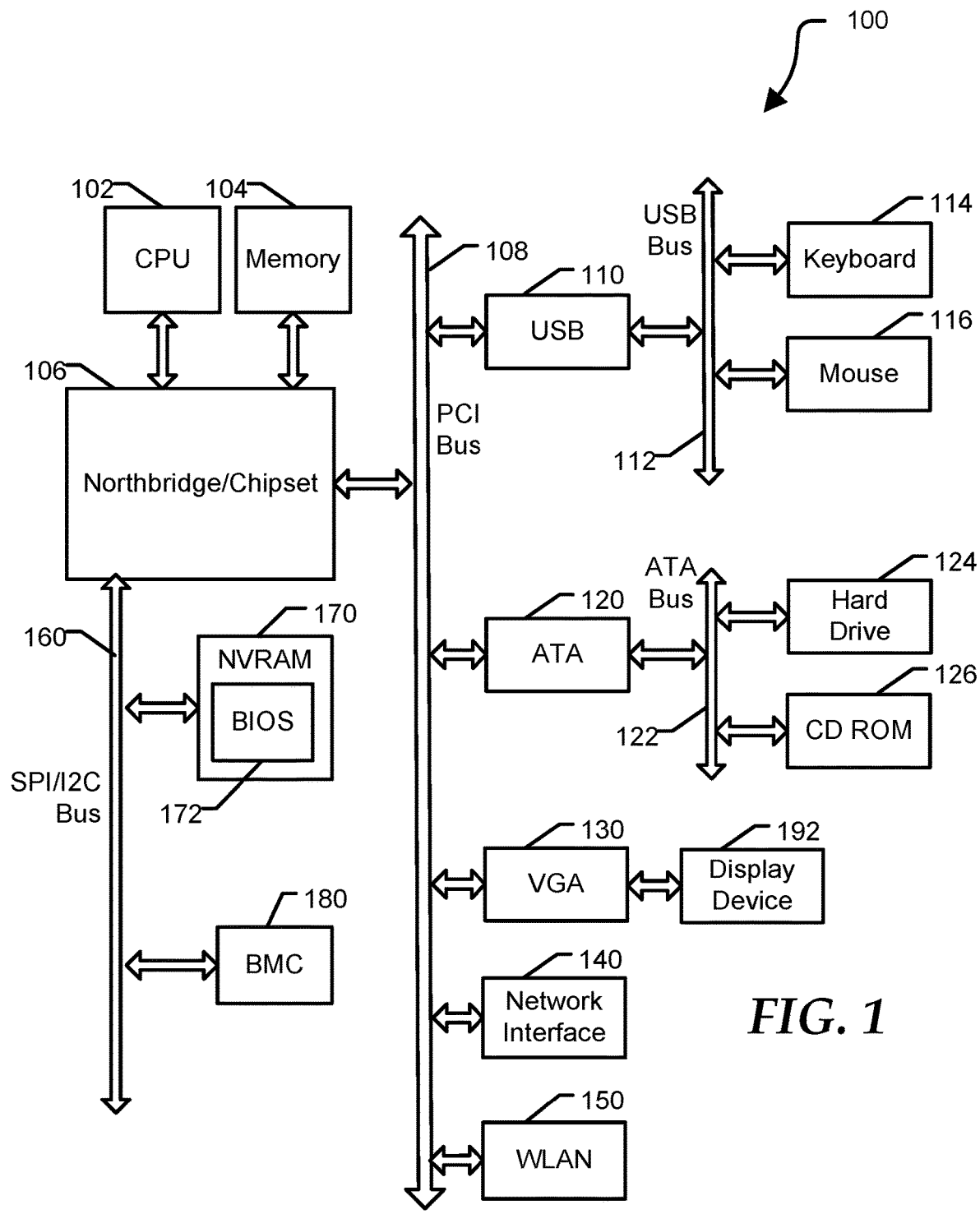
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skill in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
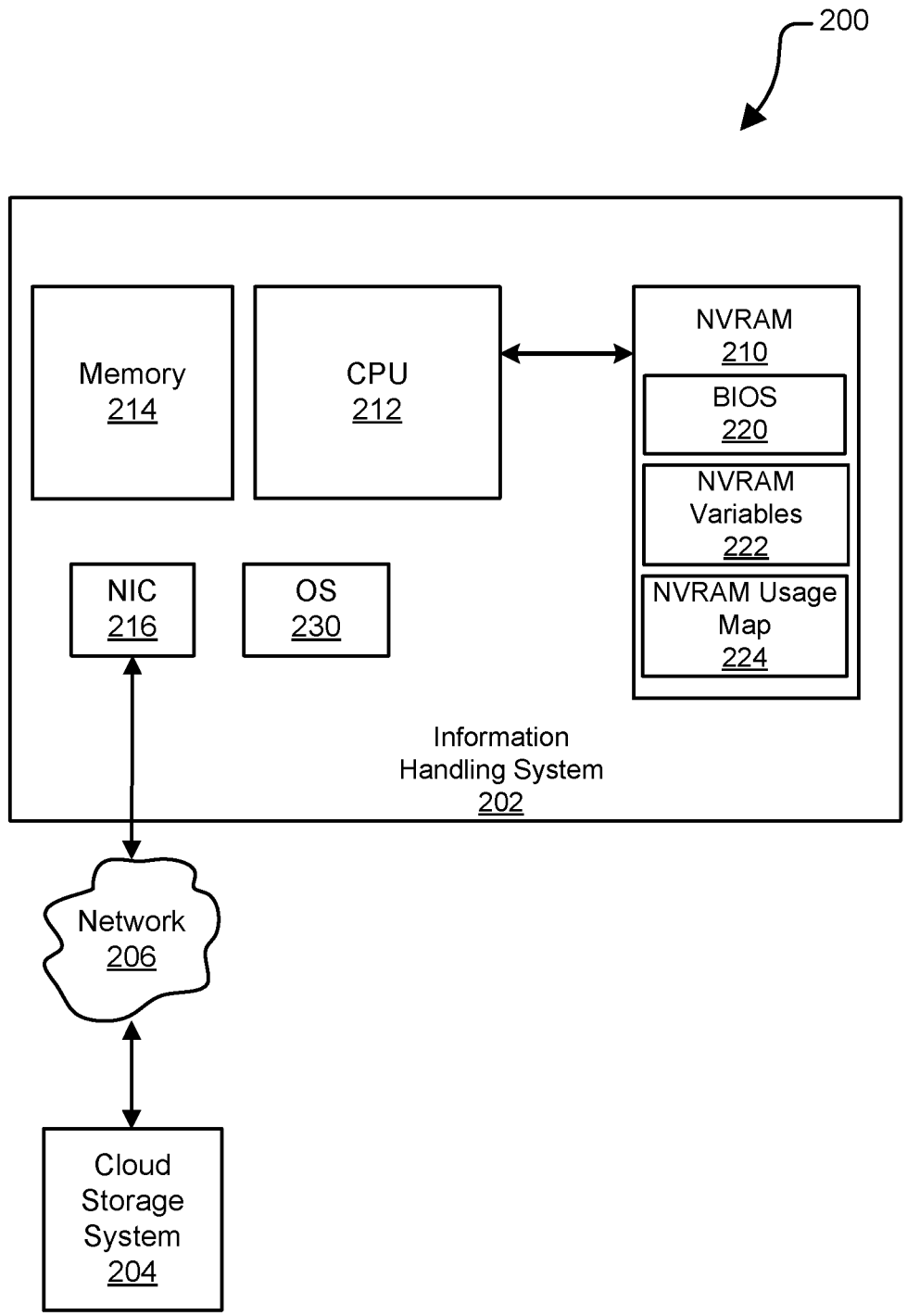
FIG. 2 is a block diagram of a system including a portion of an information handling system for optimizing usage of a non-volatile random access memory according to at least one embodiment of the disclosure.

FIG. 2 shows a system 200 including a portion of an information handling system 202 for optimizing usage of a non-volatile random access memory (NVRAM) according to at least one embodiment of the disclosure. System 200 also includes a cloud storage system 204, and a network 206 to enable communication between information handling system 202 and the cloud storage system. Information handling system 202 may be included in any suitable system with any additional components including, but not limited to, a personal computer, a management server rack, one or more server racks, and a display device. Information handling system 202 may be employed, in whole or in part, by information handling system 100 illustrated in FIG. 1, or any other system, device, component, or the like operable to employ portions, or all of, the information handling system. In an example, information handling system 202 may include more components than shown in FIG. 2 without varying from the scope of this disclosure. Information handling system 202 includes any suitable components or devices including NVRAM 210, a central processing unit or processor 212, a memory 214, a network interface card (NIC) 216, and other components.

In an example, the other components may include any suitable components including, but not limited to, one or more processors, one or more memory devices, one or more fans, and one or more PCIe devices. NVRAM 210 may store any suitable data including, but not limited to, a basic input/output system (BIOS) 220, one or more NVRAM variables 222, and a NVRAM usage map 224. For purposes of this application, the term NVRAM refers to all non-volatile memory technologies.

Memory 214 may be communicatively coupled to processor 212 and may include any system, device, or apparatus configured to retain program instructions and/or data for a period of time (e.g., computer-readable media). Memory 214 may include RAM, EEPROM, a PCMCIA card, flash memory, magnetic storage, opto-magnetic storage, or any suitable selection and/or array of volatile or non-volatile memory that retains data after power to information handling system 202 is turned off. Memory 214 may comprise a persistent memory (e.g., comprising one or more NVDIMMs) that includes a volatile memory (e.g., DRAM or other volatile random-access memory) and non-volatile memory (e.g., flash memory or other non-volatile memory).

Processor 212 may be communicatively coupled to NVRAM 210 and NIC 216. Processor 212 may include any system, device, or apparatus configured to interpret and/or execute program instructions and/or process data, and may include, without limitation a microprocessor, microcontroller, or any other digital or analog circuitry configured to interpret and/or execute program instructions and/or process data. In some examples, processor 212 may interpret and/or execute program instructions and/or process data stored in NVRAM 210. Processor 212 may be configured to run OS 230, such as Windows-based OS, Linux-based OS, or the like, during in-band operation, and can be configured to run Firmware Management Protocol (FMP) based pre-boot code, such as Dell Life Cycle Controller, during out-of-band operation as needed.

In an example, processor 212 may communicate with cloud storage system 204 via NIC 216 and network 206. In certain examples, cloud storage system 204 may be part of a cloud-computing facility. Cloud computing may refer to the access of computing resources and data via a network infrastructure, such as the Internet. The computing resources and data storage may be provided by linked data centers of the network infrastructure. In many embodiments, cloud computing resources are provided on demand to customers. As a result, the customers may have access to needed computer resources without having to purchase equipment or construct data centers.

NVRAM 210 may be utilized to store any suitable data for use in information handling system 202 including, but not limited to, system configurations, UEFI variables, a system boot flow path, and system telemetry data. The UEFI or system variable services of BIOS 220 may provide an interface for the BIOS to read, write, and delete a variable, such as NVRAM variable 222. Unfortunately, UEFI system variable services may add more overhead to the NVRAM management. For example, while executing UEFI system variable services of BIOS 220, processor 212 may update a NVRAM variable 222 with only 1 bit of data. However, this update of 1 bit of data may result in an overhead of at least 320 bits or 40 bytes. This amount of overhead is an inherent feature of the variable services in BIOS 220 because the access interface uses a 128 bit globally unique identifier (GUID) and variable name of NVRAM variable 222.

In an example, other operations associated with NVRAM 210 may affect operation of information handling system 202. For example, these operations may include, but are not limited to, write/erase cycles and garbage collection operations. Before data may be rewritten in a particular region of NVRAM 210, that region is first erased. The erase cycle may create a slow response time of a write request to NVRAM 210. A garbage collection process may be performed on NVRAM 210 during boot operations of information handling system 202. During the garbage collection process a region of NVRAM 210 is reclaimed to enable a new set of data to be written to that region. However, garbage collection operations may add more than 40 seconds of additional boot time to information handling system 202.

In some previous information handling systems, efficiency of NVRAM 210 was increased by adding a holding area NVRAM variable 222. In the previous information handling systems a size of the holding area is fixed and static across all NVRAM variables 222. However, the fixed and static size of the holding area may limit the NVRAM utilization efficiency because system usage behaviors, peripheral device connections and usage patterns may be different for every user and for every platform configuration. Thus, information handling system 202 may be improved by utilizing a variable size of the holding area in NVRAM variable 222 to increase the utilization and efficiency of NVRAM 210. In an example, utilization of NVRAM variables 222 may be improved with an addition of metadata to the NVRAM variable as described below with respect to FIG. 3.

Figure 3:
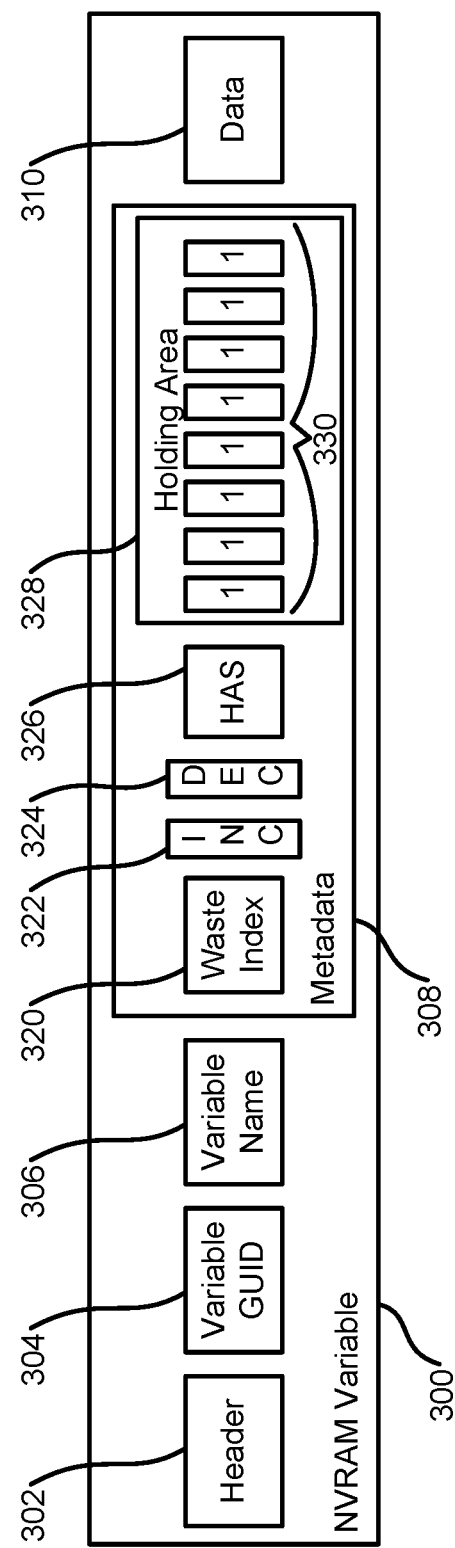
FIG. 3 is a schematic diagram of a non-volatile random access memory variable according to at least one embodiment of the disclosure.

FIG. 3 is a schematic diagram of a NVRAM variable 300 according to at least one embodiment of the disclosure. NVRAM variable 300 may be any suitable NVRAM variable including, but not limited to, one or more of NVRAM variables 222 of FIG. 2. NVRAM variable 300 includes a header 302, a variable GUID 304, a variable name 306, metadata 308, and data 310. In an example, header 302 may be any suitable data to provide information about NVRAM variable 300. GUID 304 may be any suitable number used to identify NVRAM variable 300 including, but not limited to, a 128 bit integer number. Variable name 306 may be any system, administrator, or user name for NVRAM variable 300 including, but not limited to, a boot operation, a video brightness, an audio setting, and a Boolean variable. In an example, metadata 308 may include any suitable data providing information about data 310 including, but not limited to, a waste index 320, an increment count 322, a decrement count 324, a holding area size 326, and a holding area 328. Holding area 328 may include one or more bits 330. Data 310 may be any suitable data stored for NVRAM variable 300 including, but not limited to, a state of the variable and a current level of the variable.

In an example, waste index 320 may include any suitable data indicating the number of updates to NVRAM variable 300 within one garbage collection session. Waste index 320 may be reset to zero every time a new NVRAM space is created for NVRAM variable 300. Increment count 322 may include any suitable data indicating the number of times holding area 328 has been increased. Decrement count 324 may include any suitable data indicating the number of times holding area 328 has been decreased. Holding area size 326 may include any suitable data to indicate a current size of holding area 328, such as 8 bits, 16 bits, 32 bits, and 64 bits.

In an example, a processor executing system BIOS variable services, such as processor 212 executing variable services of BIOS 220 of FIG. 2, may utilize metadata 308 of NVRAM variable 300 to control an update a size of holding area 328, which in turn may optimize the efficiency of NVRAM 210 storing the NVRAM variable. Adjusting the size of holding area 328 will be described with respect to FIGS. 2 and 3.

In certain examples, bits 330 of holding area 328 may be utilized to recycle or update NVRAM variable 300 multiple times without having to perform an update to the NVRAM variable that would result in the amount of overhead as described above with respect to the previous information handling systems. For example, holding area 328 may include any suitable number of bits to indicate a current state of NVRAM variable 300. In an example, each time the state of NVRAM variable 300 is changed one of bits 330 is changed from '1' to '0'. For example, an initial enabled state of NVRAM variable 300 is set by all bits 330 in holding area 328 being set to '1', then a disabled state is indicated by a first bit in the holding area being changed to '0', the enabled state can be indicated again by a second bit in the holding area also being changed to '0', and so on bit by bit until all of the bits have been set to '0'. In an example, if all bits 330 are set to '1' or an even number of the bits are set to '0', then NVRAM variable 300 is enabled. If an odd number of bits 330 are set to '0', NVRAM variable 300 is disabled. Additionally, if all bits 330 are set to '0', NVRAM variable 300 is set as a junk variable that needs to be reclaimed during a garbage collection operation. While the bits 330 are described as initially be set to '1' and changed to '0' to indicate a state change of NVRAM variable 300, the bits may be initially set to '0' and changed to '1' to indicate a state change without varying from the scope of this disclosure.

During operation, processor 212 may implement a machine learning process to tune a recycle index of NVRAM 300 to maximize the utilization of NVRAM 210 and to reduce a garbage collection frequency for the NVRAM variable. In an example, the recycle index for NVRAM variable 300 may be the number of times that the NVRAM variable may be updated or changed before the NVRAM variable needs to be reclaimed during a garbage collection operation. For example, the larger the size of holding area 328, the larger the recycle index for NVRAM variable 300. However, if holding area 328 is larger than needed, NVRAM variable 300 may consume too much of NVRAM 210 because the holding area has more bits 330 than needed. In an example, holding area 328 may be too large if a number of bits 330 within the holding area are not used during a garbage collection cycle because NVRAM variable 300 is not updated or changed often enough during the garbage collection cycle. In certain examples, the size of holding area 328 may be too small if all bits 330 within the holding area are used before the end of the garbage collection cycle. In an embodiment, the size of holding area 328 is equal to a number of bits 330 within the holding area. In an example, processor 212, via a machine learning process, may learn a usage pattern for NVRAM variable 300 and automatically adjust the size of holding area 328 to maximize the efficiency of NVRAM 210.

In an example, BIOS 220 may collect and build a table to track a garbage collection trend, which is a number of boots between two subsequent garbage collection events or operations. In certain examples, as the number of boot cycles between consecutive increases, the efficiency of information handling system 202 also increases. Thus, processor 212 may utilize the number of boot cycles between consecutive garbage collection events to determine whether the recycle indexes for NVRAM variables 222 are properly tuned.

In certain examples, processor 212, via the machine learning process, may utilize waste index 320, increment count 322, decrement count 324, and holding area size 326 to tune holding area 328 based on the usage pattern of NVRAM variable 300. In an example, processor 212 may calculate an update frequency for NVRAM variable 300 using any suitable formula. For example, the formula or equation to calculate the update frequency may be equation 1 below:

$$\text{Update Frequency} = (((\text{Waste Index}+1)*(\text{Total holding area bits})) - (\text{unused bits})) \qquad \text{EQ. 1}$$

Processor 212, via the machine learning process, may utilize the update frequency for NVRAM variable 300 in determining whether to increase or decrease the size of holding area 328.

In certain examples, processor 212 may execute system BIOS variable services during any suitable event to create a new storage area within NVRAM 210 for a particular NVRAM variable, such as NVRAM variable 300. For example, processor 212 may create a new storage area for NVRAM variable 300 with a new size of holding area 328 when bits 330 within the holding area are completely used, during a garbage collection operation, or the like. In an example, while executing the system BIOS variable services, processor 212 may utilize the predictive algorithm of the machine learning process to calculate a new size of holding area 328 based on the metadata of NVRAM variable 300, such as waste index 320, increment count 322, decrement count 324, and holding area size 326. Exemplary results of the predictive algorithm of the machine learning process for multiple NVRAM variables 222 are illustrated in Table 1 below:

TABLE 1

| Variable | Waste Index | Counter Increment | Counter Decrement | Current Holding Area Size | Result of New Size of Holding Area |
|---|---|---|---|---|---|
| 1 | 0 | 1 | 0 | 8 bits | Increase to 16 bits |
| 2 | 7 | 3 | 0 | 16 bits | Increase to 64 bits |
| 3 | 0 | 1 | 0 | 64 bits | Decrease to 32 bits |
| 4 | 1 | 3 | 2 | 16 bits | No Change |
| 5 | 3 | 2 | 0 | 16 bits | Increase to 32 bits |

As shown in Table 1 above, execution of the predictive algorithm of the machine learning process by processor 212 results in new storage areas for five NVRAM variables 222 with sizes of holding areas as indicated in the table. For example, NVRAM variables 1, 2, and 5 have larger sizes of holding areas, NVRAM variable 3 has a smaller size of its holding area, and NVRAM variable 4 has the same size of its holding area.

Additionally, during a garbage collection operation, processor 212 may reformat data within holding area 328 of NVRAM variable 300 to further increase the efficiency and utilization of NVRAM 210. For example, if the holding pattern or usage of bits 330 is above a threshold value during the garbage collection operation, processor 212 may reformat the data within the bits of holding area 328 to reduce the holding pattern or usage to a value below the threshold value. In an embodiment, the threshold value may be any suitable amount including, but not limited to, usage amounts of 50%, 60%, and 75%. The value below the threshold value may be any suitable amount including, but not limited to, usage amounts of 0%, 12.5%, and 25%. In an example, data 310 represented by bits 330 is not changed during the reformatting process. For example, if NVRAM variable 300 is a Boolean variable representing either enabled or disable, the state of the NVRAM variable remains the same as described with respect to FIGS. 4 and 5 below.

Figure 4:
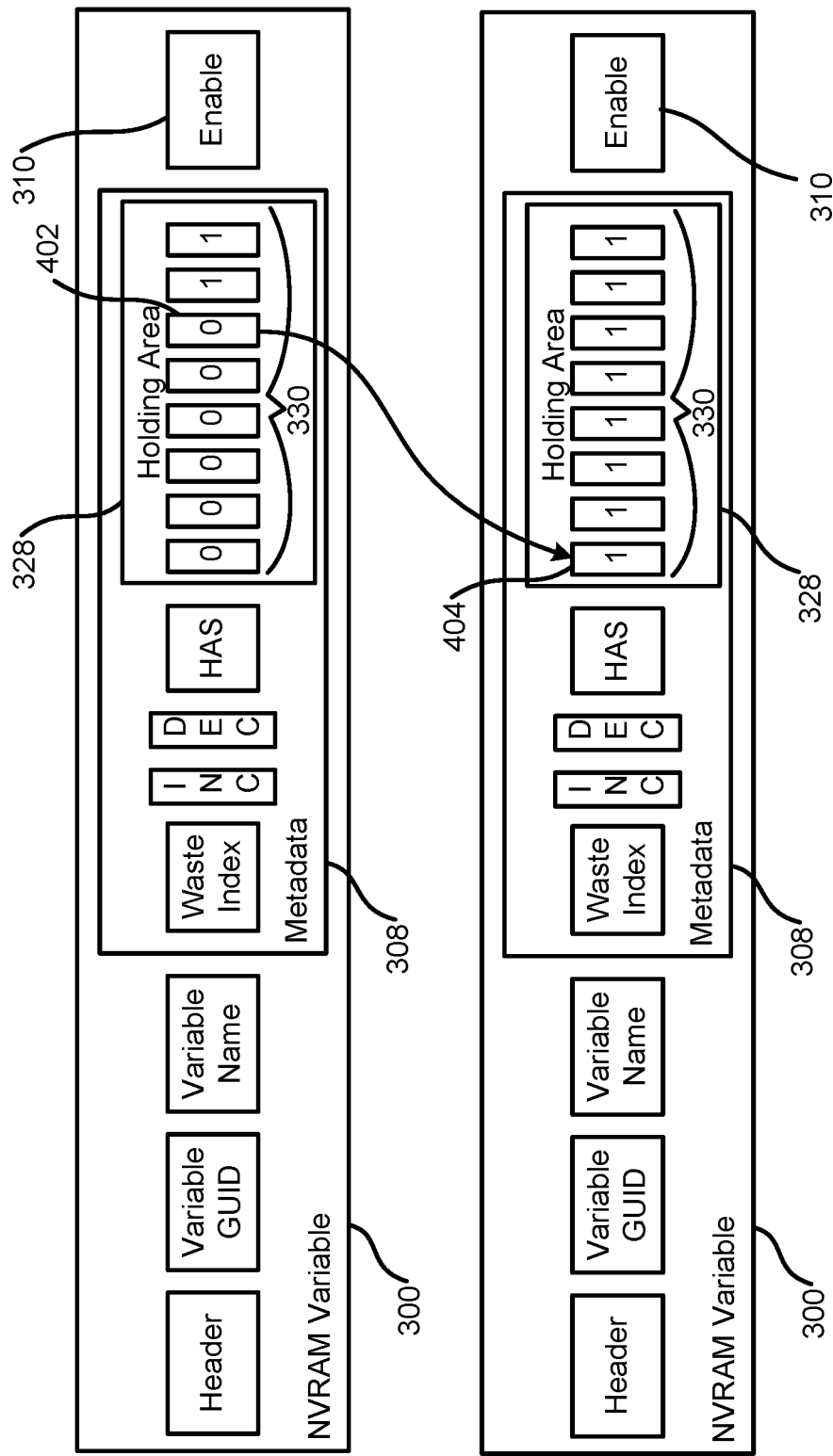
FIG. 4 is a schematic diagram of a non-volatile random access memory variable being reformatted to reduce usage while maintaining a first state according to at least one embodiment of the disclosure.

FIG. 4 shows a schematic diagram of NVRAM variable 300 being reformatted to reduce usage while maintaining a first state according to at least one embodiment of the disclosure. In an example, the first state of NVRAM variable 300 may be an enabled state as represented by data 310. During consecutive updates to NVRAM 300, consecutive bits 330 within holding area 328 of metadata 308 may be changed. As stated above with respect to FIG. 3, if an even number of bits 300 are set to '0', NVRAM variable 300 is enabled as shown FIG. 4. During a garbage collection operation, processor 212 may determine that a holding pattern or usage of bits 330 is above the threshold value, such that the data within the bits of holding area 328 should be reformatted. In this example, six of bits 330 ending with bit 402 are set to '0' indicating that NVRAM is enabled. Thus, processor 212 may reformat the data of bits 330 to reduce the holding pattern or usage while maintaining the state of NVRAM variable 300. In an example, the state of NVRAM 300 may be maintained by moving the state indicated by bit 402 to bit 404. For example, processor 212 may reset all bits 330 of NVRAM variable 300 to '1' starting with bit 404, which reduces the holding pattern or usage to 0% while maintaining the enabled state.

Figure 5:
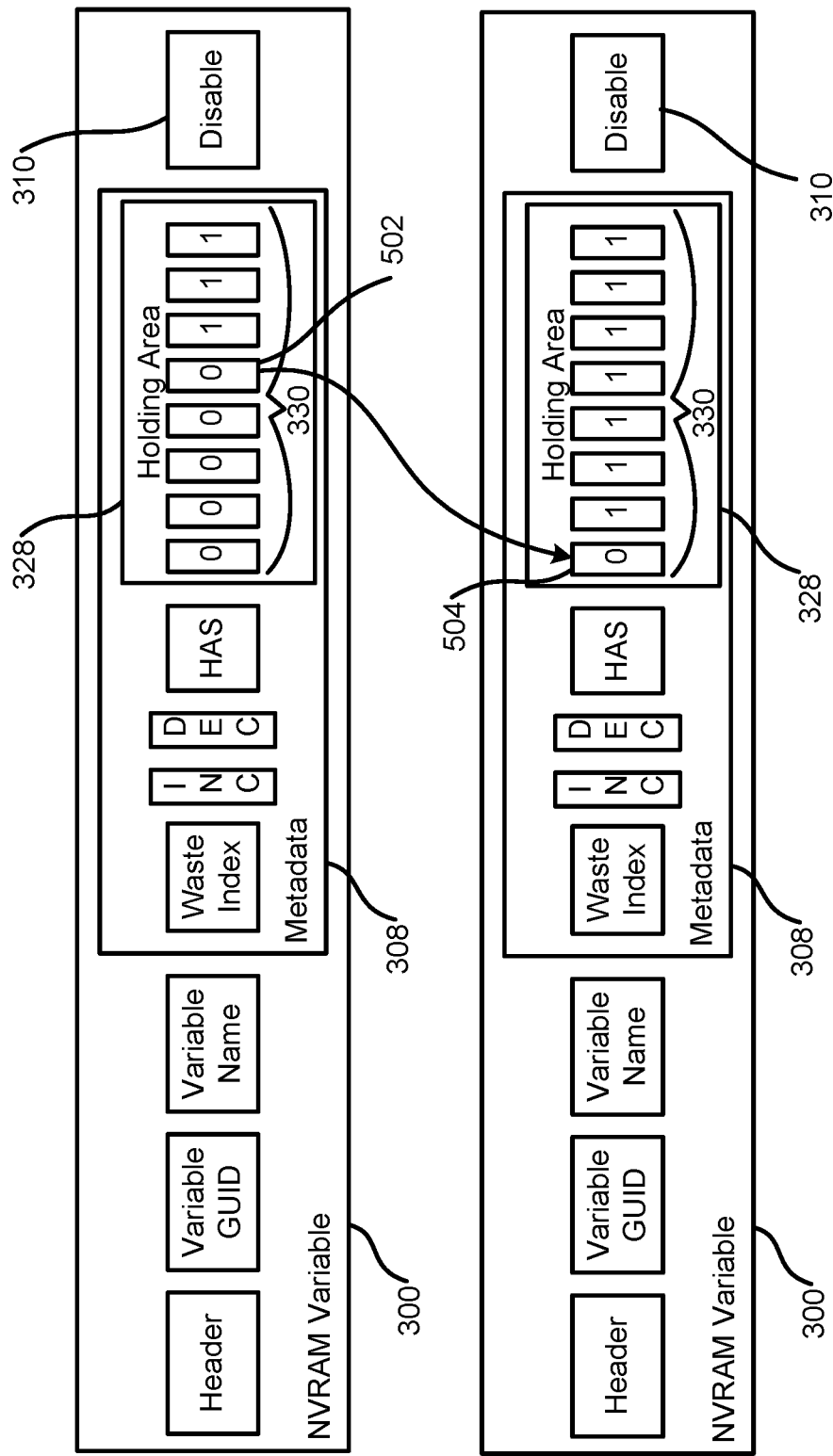
FIG. 5 is a schematic diagram of a non-volatile random access memory variable being reformatted to reduce usage while maintaining a second state according to at least one embodiment of the disclosure.

FIG. 5 shows a schematic diagram of NVRAM variable 300 being reformatted to reduce usage while maintaining a second state according to at least one embodiment of the disclosure. In an example, the second state of NVRAM variable 300 may be a disabled state as represented by data 310. During consecutive updates to NVRAM 300, consecutive bits 330 within holding area 328 of metadata 308 may be changed. As stated above with respect to FIG. 3, if an odd number of bits 300 are set to '0', NVRAM variable 300 is disabled as shown FIG. 5. During a garbage collection operation, processor 212 may determine that a holding pattern or usage of bits 330 is above the threshold value, such that the data within the bits of holding area 328 should be reformatted. In this example, five of bits 330 ending with bit 502 are set to '0' indicating that NVRAM is enabled. Thus, processor 212 may reformat the data of bits 330 to reduce the holding pattern or usage while maintaining the state of NVRAM variable 300. In an example, the state of NVRAM 300 may be maintained by moving the state indicated by bit 502 to bit 504. For example, processor 212 may reset all bits 330 of NVRAM variable 300 to '1' except bit 504 that remains set to '0', which reduces the holding pattern or usage to 12.5% while maintaining the disabled state.

Referring back to FIG. 2, processor 212 utilizing BIOS 220 may perform one or more operations to maintain a NVRAM usage map 224 for information handling system 200, which may be utilized to pre-set a predictive algorithm in a new information handling system. In an example, the creation of a backup NVRAM usage map may be performed during any suitable operation including, but not limited to, a garbage collection operation. In response to the garbage collection operation being initiated, processor 212 may execute BIOS 220 to collect NVRAM usage map 224. Based on the NVRAM usage map 224, processor 212 may create a runtime data record of the NVRAM usage map, and then may send it to OS 230 using any suitable method including, but not limited to, a windows management instrumentation (WMI) method.

Upon OS 230 receiving the runtime data record of NVRAM usage map 224, an OS agent may read the data record and send the data record to cloud storage system 204 via NIC 216 and network 206. In an example, the OS agent may also send any suitable identifier of a user of information handling system 202, such as a user profile login, to cloud storage system 204. In certain examples, the data record may be associated with the user profile for later access by the user of information handling system 202. In an example, the OS agent may also store a copy of the data record within any suitable memory of information handling system 202 including, but not limited to, memory 214.

In an example, the user of information handling system 202 may decide to retrieve the data record of NVRAM usage map from cloud storage system 204 for any suitable reason including, but not limited, the information handling system being reset to factory settings, the user received a new information handling system, and changes being made to the information handling system. Processor 212 may communicate with cloud storage system 204 via NIC 216 and network 206 to provide user profile login information associated with the data record of NVRAM usage map 224. In response to the user profile login information being authenticated, cloud storage system 204 may provide NVRAM usage map to the OS agent of information handling system 202 or a new information handling system.

Upon receiving NVRAM usage map 224, the OS agent may determine whether the received NVRAM usage map 224 is a newer usage map than a current NVRAM usage map stored on information handling system 202. If NVRAM usage map 224 received from cloud storage system 204 is not newer, the received NVRAM usage map is not stored in information handling system 202. However, if NVRAM usage map 224 received from cloud storage system 204 is a newer usage map, the OS agent may send the NVRAM usage map to BIOS 220 using any suitable method including, but not limited to, a WMI method. BIOS 220 the may apply NVRAM usage map 224 by storing it in NVRAM 210 and utilizing the NVRAM usage map in the predictive algorithm to update a size of a holding area in a NVRAM variable 222.

In an example, information handling system 202 may be improved by reducing used space of NVRAM 210 with the holding areas of one or more NVRAM variables 222 are reduced. Additionally, the variable sized holding areas of NVRAM variables 222 may reduce overall boot times by reducing a number of garbage collection operations in response to the bits of the holding areas being utilized to update the NVRAM variable multiple times before a garbage collection operation is needed.

Figure 6:
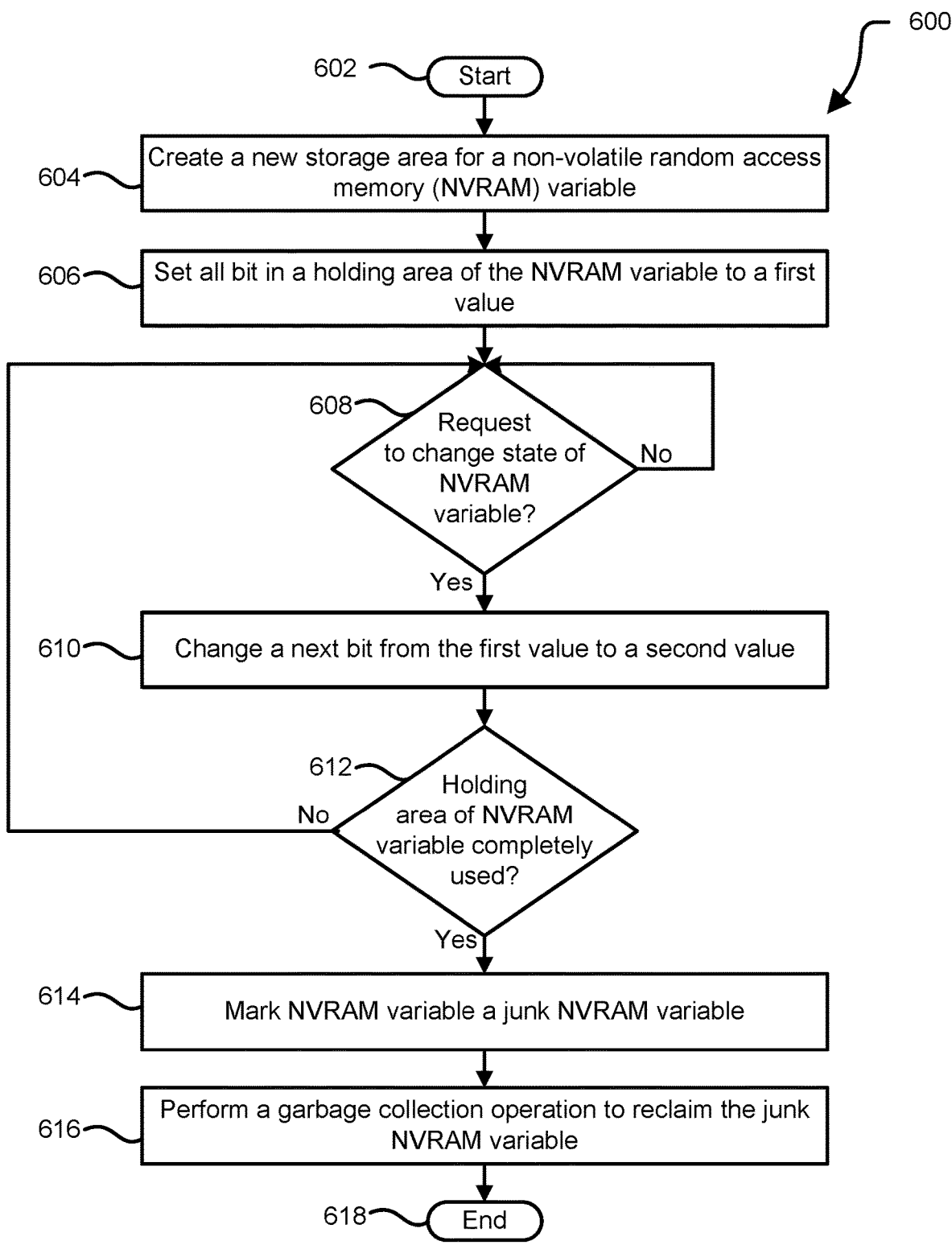
FIG. 6 is a flow diagram illustrating a method for updating a state of a non-volatile random access memory variable by changing bits of a holding area for the non-volatile random access memory variable according to at least one embodiment of the disclosure.

FIG. 6 is a flow diagram illustrating a method 600 for updating a state of a NVRAM variable by changing bits of a holding area for the NVRAM variable according to at least one embodiment of the disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 6.

At block 604, a new storage area for the NVRAM variable is created. In an example, the new storage area may be created within an NVRAM of the information handling system. The NVRAM variable may include a holding area with multiple bits to enable a state of the NVRAM variable to be updated or changed without completely rewriting the entire NVRAM variable. At block 606, all of the bits within the holding area of the NVRAM variable are set to a first value. In an example, all of the bits may be set to '1' to indicate that the NVRAM variable is in a first state, such as enabled, on, or the like.

At block 608, a determination is made whether a change state request of the NVRAM variable has been requested. In response to the state change being requested, a next bit of the holding area is changed from the first value to a second value at block 610. For example, the initial enabled state of the NVRAM variable may be set by all bits in holding area being set to '1', then a disabled state is indicated by a first bit in the holding area being changed to '0', the enabled state can be indicated again by a second bit in the holding area also being changed to '0', and so on bit by bit until all of the bits have been set to '0'. At block 612, a determination is made whether all of the bits in the holding area are completely used. In an example, all of the bits are completely used when all of the bits have been changed from the first state to the second state, such as from '1' to '0'.

If not all of the bits have been used, the flow continues as stated above at block 608. However, if all of the bits have been used, the NVRAM is marked as a junk NVRAM variable at block 614. In an example, if all of the bits in the holding area are set to '0', the NVRAM variable is set as a junk variable that needs to be reclaimed during a garbage collection operation. While the bits are described as initially be set to '1' and changed to '0' to indicate a state change of the NVRAM variable, the bits may be initially set to '0' and changed to '1' to indicate a state change without varying from the scope of this disclosure. At block 616, a garbage collection operation is performed to reclaim the junk NVRAM variable, and the method ends at block 618. In an example, the garbage collection operation may include creating a new storage area for the NVRAM variable and changing the number of bits within the holding area of the NVRAM variable as described above.

Figure 7:
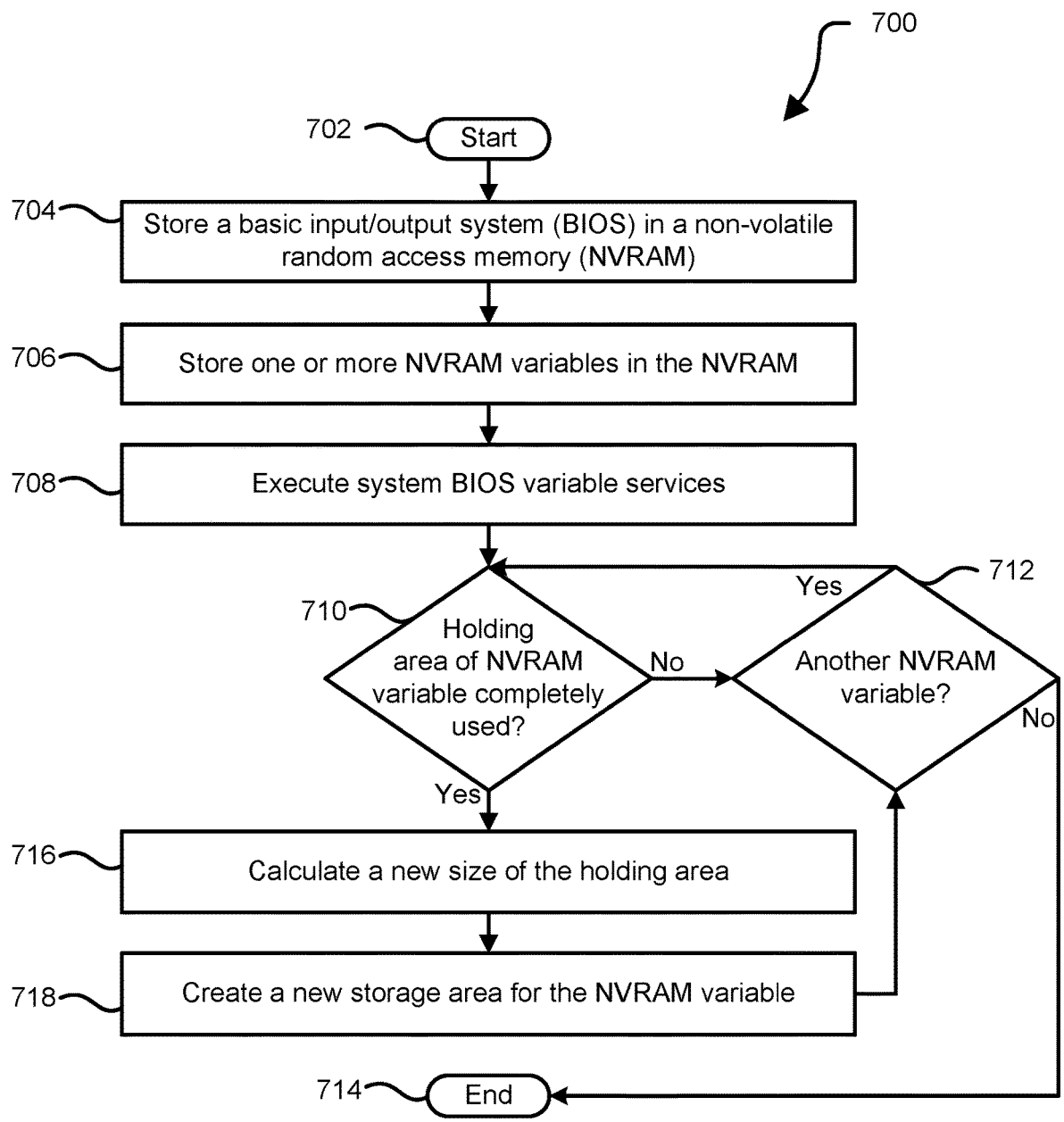
FIG. 7 is a flow diagram illustrating a method for updating a size of a holding area for a non-volatile random access memory variable according to at least one embodiment of the disclosure.

FIG. 7 is a flow diagram illustrating a method 700 for updating a size of a holding area for a NVRAM variable according to at least one embodiment of the disclosure, starting at block 702. It will be readily appreciated that not every method step set forth in this flow diagram is always necessary, and that certain steps of the methods may be combined, performed simultaneously, in a different order, or perhaps omitted, without varying from the scope of the disclosure. FIG. 7 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 7.

At block 704, a BIOS is stored in a NVRAM of the information handling system. In an example, the BIOS may include system BIOS variable services. At block 706, one or more NVRAM variables are stored in the NVRAM. In an example, the NVRAM variable may be any suitable BIOS variable including, but not limited to, boot operation, video brightness, audio setting, and Boolean variable. At block 708, the system BIOS variable services are executed. In certain examples, the system BIOS variable services may be triggered by any suitable event including, but not limited to, a holding area of a NVRAM variable being completely used, and a garbage collection operation. If the system BIOS variable service is triggered in response to the holding area of the NVRAM variable being completely used, the flow continues at block 716. However, if the system BIOS variable service is triggered in response to a garbage collection operation, a determination is made whether a holding area of the NVRAM variable is completely used at block 710.

If the holding area of the NVRAM variable is not completely used, a determination is made whether another NVRAM variable is located with the NVRAM at block 712. If another NVRAM variable is in the NVRAM, the flow continues as stated above at block 710. Otherwise, if no more NVRAM variables are in the NVRAM, the method ends at block 714. If, at block 710, the holding area of the NVRAM variable is completely used, a new size of the holding area is calculated based on metadata for the NVRAM variable at block 716. In an example, the metadata for the NVRAM variable may be any suitable data including, but not limited to, a waste index, an increment count, a decrement count, and a holding area size. At block 718, a new storage area for the NVRAM variable is created, and the method continues as stated above at block 712. In an example, the new storage area may include a holding area with a size equal to the calculated size of the holding area.

Figure 8:
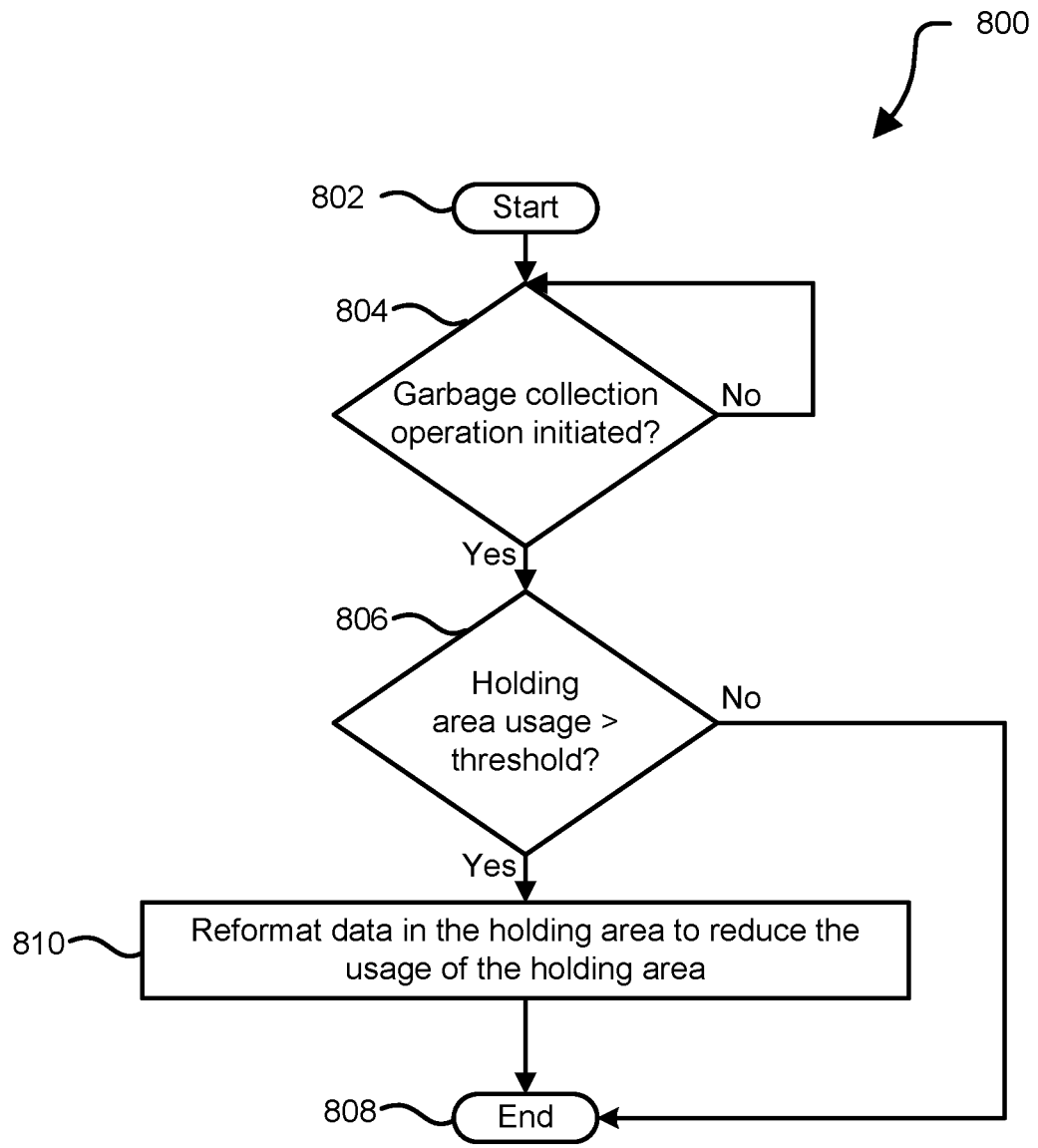
FIG. 8 is a flow diagram illustrating a method for reformatting data within a non-volatile random access memory variable according to at least one embodiment of the disclosure.

FIG. 8 is a flow diagram illustrating a method 800 for reformatting data within a NVRAM variable according to at least one embodiment of the disclosure, starting at block 802. It will be readily appreciated that not every method step set forth in this flow diagram is always necessary, and that certain steps of the methods may be combined, performed simultaneously, in a different order, or perhaps omitted, without varying from the scope of the disclosure. FIG. 8 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 8.

At block 804, a determination is made whether a garbage collection operation has been initiated. In an example, during the garbage collection process a region of NVRAM is reclaimed to enable a new set of data to be written to that region. In response to the garbage collection operation being initiated, a determination is made whether a holding area usage is greater than a threshold value at block 806. In an example, the threshold value may be any suitable amount including, but not limited to, usage amounts of 50%, 60%, and 75%.

If the holding area usage is not greater than the threshold value, the method ends at block 808. However, in response to the usage of the holding area being greater than a threshold value, data in the holding area is reformatted to reduce the usage of the holding area at block 810, and the method ends at block 808. In an example, the reduction of the usage may be to any value below the threshold including, but not limited to, usage amounts of 0%, 12.5%, and 25%. In certain examples, a current state of the NVRAM variable may be maintained during the reformatting of the data in the holding area.

Figure 9:
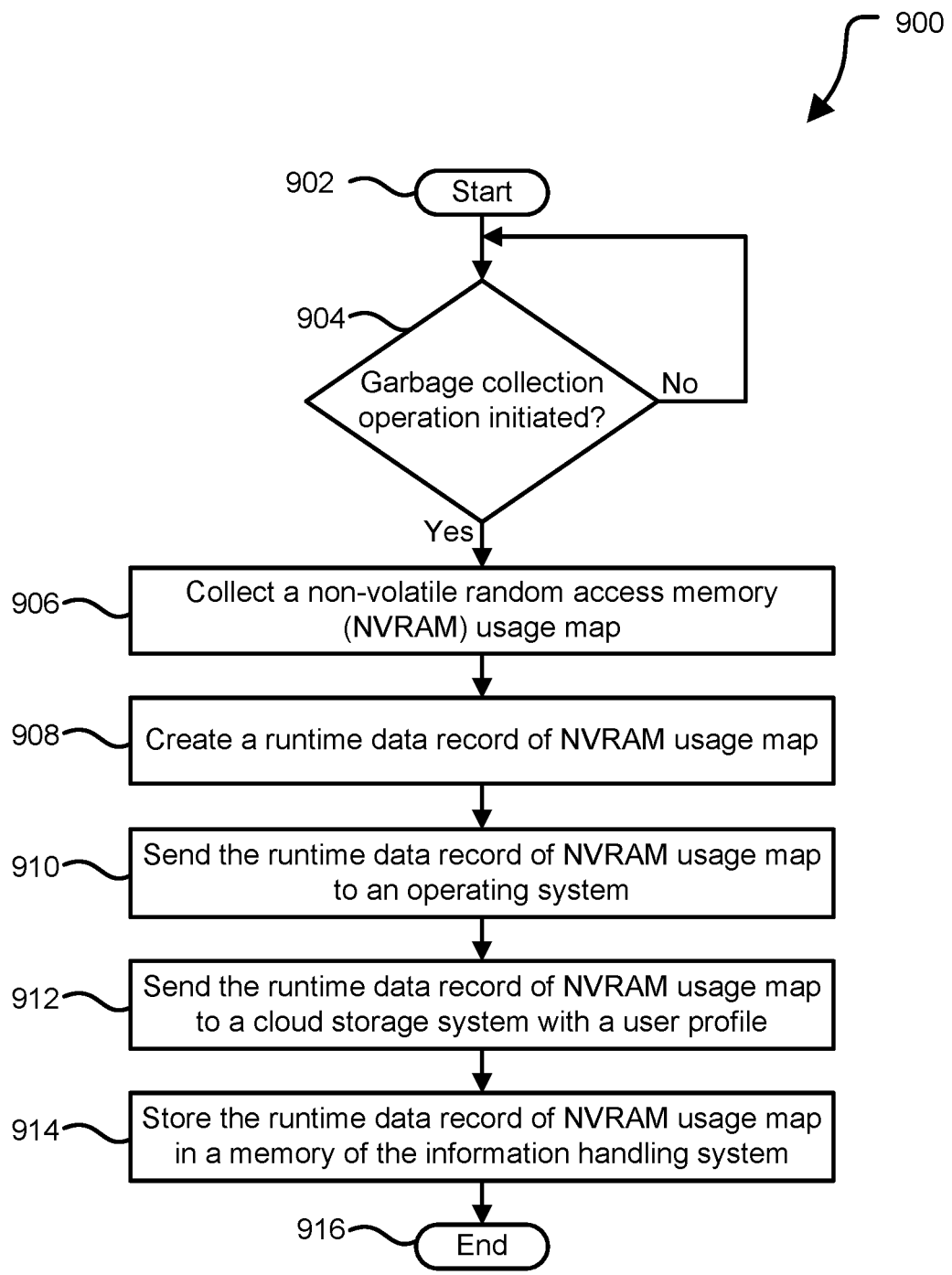
FIG. 9 is a flow diagram illustrating a method for storing a non-volatile random access memory usage map in a cloud storage system according to at least one embodiment of the disclosure.

FIG. 9 is a flow diagram illustrating a method 900 for storing a NVRAM usage map in a cloud storage system according to at least one embodiment of the disclosure, starting at block 902. It will be readily appreciated that not every method step set forth in this flow diagram is always necessary, and that certain steps of the methods may be combined, performed simultaneously, in a different order, or perhaps omitted, without varying from the scope of the disclosure. FIG. 9 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 9.

At block 904, a determination is made whether a garbage collection operation has been initiated. In an example, during the garbage collection process a region of NVRAM is reclaimed to enable a new set of data to be written to that region. In response to the garbage collection operation being initiated, a NVRAM usage map is collected at block 906. In an example, the NVRAM usage map may be utilized by a predictive algorithm to determine whether to increase or decrease sizes of holding areas of one or more NVRAM variables.

At block 908, a runtime data record of the NVRAM usage map is created. At block 910, the runtime data record of the NVRAM usage map is sent to an OS of the information handling system. In an example, the data record may be sent from BIOS to the OS via any suitable method including, but not limited to, a WMI method. At block 912, the runtime data record of the NVRAM usage map is sent to a cloud storage system along with a user profile for the NVRAM usage map. In an example, an OS agent of the information handling system may send the data record to the cloud storage system. At block 914, the runtime data record of the NVRAM usage map is stored in a memory of the information handling system, and the method ends at block 916.

Figure 10:
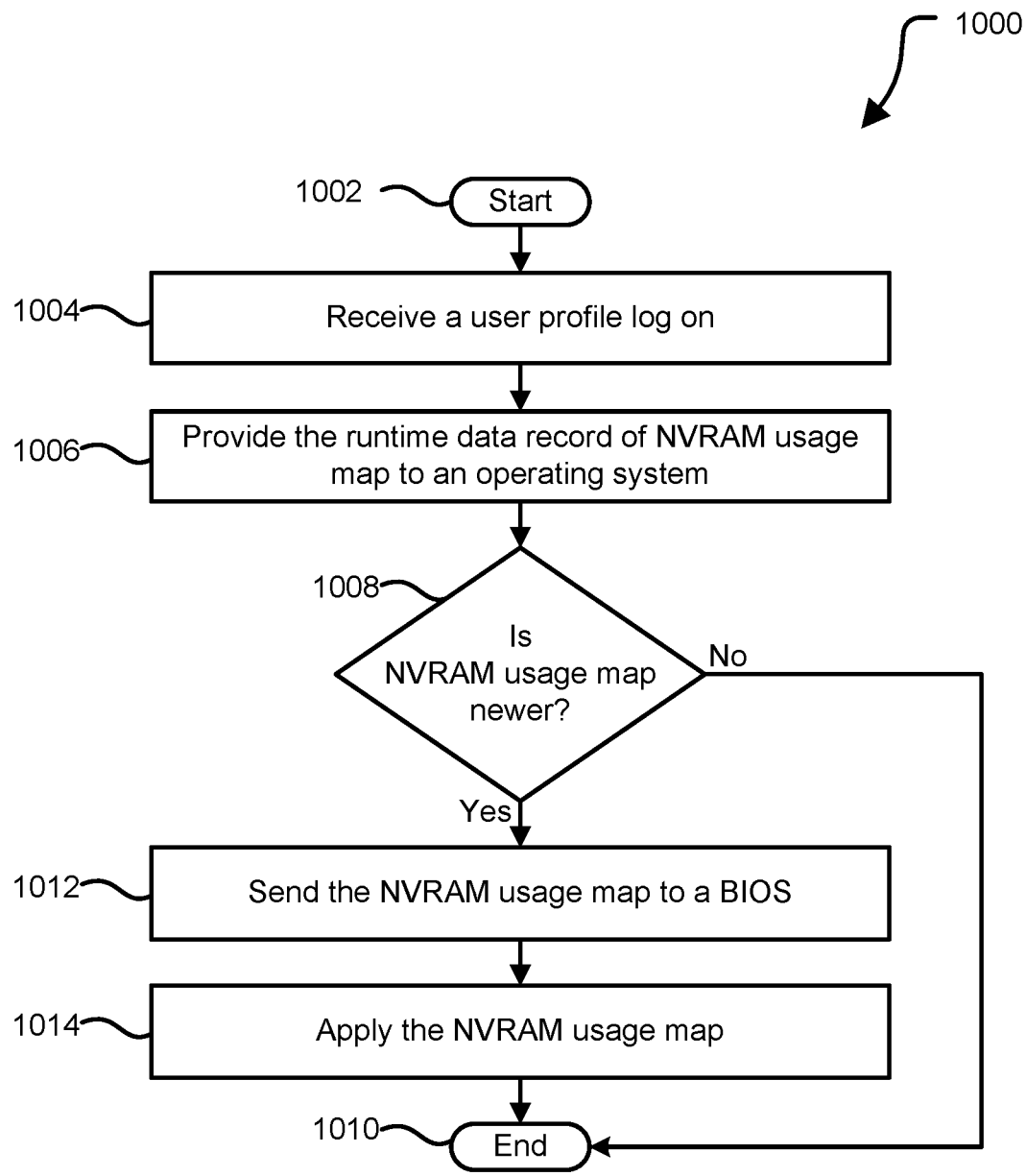
FIG. 10 is a flow diagram illustrating a method for storing a non-volatile random access memory usage map received from a cloud storage system according to at least one embodiment of the disclosure.

FIG. 10 is a flow diagram illustrating a method 1000 for storing a NVRAM usage map received from a cloud storage system according to at least one embodiment of the disclosure, starting at block 1002. It will be readily appreciated that not every method step set forth in this flow diagram is always necessary, and that certain steps of the methods may be combined, performed simultaneously, in a different order, or perhaps omitted, without varying from the scope of the disclosure. FIG. 10 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 10.

At block 1004, a user profile log in is received. In an example, the cloud storage system may receive the user profile log in from an information handling system. At block 1006, a runtime data record of the NVRAM usage map is provided to an operating system of the information handling system. Based on the reception of the NVRAM usage map, a determination is made whether the received NVRAM usage map is newer than a NVRAM usage map stored in the information handling system at block 1008. If the received NVRAM usage map is not a newer usage map, the method ends at block 1010.

However, if the received NVRAM usage map is a newer usage map, the received NVRAM usage map is sent to the BIOS of the information handling system at block 1012. In an example, the NVRAM usage map may be sent to the BIOS via any suitable method including, but not limited to, a WMI method. At block 1014, the NVRAM usage map is applied, and the method ends at block 1010. In an example, the NVRAM usage map may be applied in any suitable manner including, but not limited to, storing it in a NVRAM of the information handling system and utilizing the NVRAM usage map in the predictive algorithm to update a size of a holding area in a NVRAM variable.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
    a non-volatile random access memory (NVRAM) to store a plurality of NVRAM variables and to store a basic input/output system (BIOS) of the information handling system, wherein the BIOS includes system BIOS variable services; and
    a processor to communicate with the non-volatile memory, the processor to execute the system BIOS variable services, wherein the system BIOS variable services cause the processor to:
        determine whether a holding area of a first NVRAM variable of the NVRAM variables is completely used;
        in response to the storage being completely used, calculate a new size of the holding area based on metadata of the first NVRAM variable;
        creating a new storage area for the first NVRAM variable, wherein a size of a second holding area of the new storage area equals the new size; and
        during a garbage collection operation, the processor to:
            determine whether a usage of the second holding area satisfies a threshold usage; and
            in response to the second holding area satisfying the threshold usage, to reformat data in the second holding area to reduce the usage of the second holding area to a value below the threshold usage, wherein the reformatting of the data in the second holding area includes the processor to:
                determine a number of bits in the second holding area set to a first state; and
                based on the number of bits in the second holding area set to the first state being an even number of bits, reset all of the bits in the second holding area to a second state.

2. The information handling system of claim 1, wherein the reformat of the data in the second holding area maintains an enable/disable state of the first NVRAM variable.

3. The information handling system of claim 1, the processor executing the system BIOS variable services further to:
    determine whether a garbage collection operation is triggered;
    in response to the garbage collection operation being triggered, collect a NVRAM usage map;
    create a runtime data record of the NVRAM usage map;
    provide the runtime data record of the NVRAM usage map to an operating system of the information handling system; and
    send the runtime data record of the NVRAM usage map from the operating system to a cloud storage system.

4. The information handling system of claim 1, wherein the metadata for the first NVRAM variable includes the size of the holding area, a waste index value, an increment count, and a decrement count.

5. The information handling system of claim 1, wherein the processor further to execute a machine learning process to calculate the new size of the holding area based on the metadata of the first NVRAM variable.

6. A method, comprising:
    storing a plurality of non-volatile random access memory (NVRAM) variables and a basic input/output system (BIOS) in an NVRAM of a first information handling system, wherein the BIOS includes system BIOS variable services;
    executing, by a processor, the system BIOS variable services;
    determining whether a holding area of a first NVRAM variable of the NVRAM variables is completely used;
    in response to the storage being completely used, calculating a new size of the holding area based on metadata of the first NVRAM variable;
    creating a new storage area for the first NVRAM variable, wherein a size of a second holding area of the new storage area equals the new size; and
    during a garbage collection operation:
        determining whether a usage of the second holding area satisfies a threshold usage; and
        in response to the second holding area satisfying the threshold usage, reformatting data in the second holding area to reduce the usage of the second holding area to a value below the threshold usage, wherein the reformatting of the data in the second holding area includes:
            determining a number of bits in the second holding area set to a first state; and
            based on the number of bits in the second holding area set to the first state being an even number of bits, resetting all of the bits in the second holding area to a second state.

7. The method of claim 6, wherein the reformatting of the data in the second holding maintains an enable/disable state of the first NVRAM variable.

8. The method of claim 6, further comprising:
    determining whether a garbage collection operation is triggered;
    in response to the garbage collection operation being triggered, collecting a NVRAM usage map;
    creating a runtime data record of the NVRAM usage map;
    providing the runtime data record of the NVRAM usage map to an operating system of the information handling system; and
    sending the runtime data record of the NVRAM usage map from the operating system to a cloud storage system.

9. The method of claim 8, further comprising:
    receiving a user log on at a second information handling system, wherein the user is associated with the first information handling system;
    sending, from the cloud storage system, the NVRAM usage map to an operating system of the second information handling system;

determining whether the NVRAM usage map is newer than a second NVRAM usage map currently stored in a second NVRAM of the second information handling system;

in response to the NVRAM usage map being newer than the second NVRAM usage map, sending the NVRAM usage map to a second BIOS of the second information handling system; and applying, by the BIOS, the NVRAM usage map to second NVRAM of the second information handling system.

10. The method of claim 6, wherein the metadata for the first NVRAM variable includes the size of the holding area, a waste index value, an increment count, and a decrement count.

11. The method of claim 6, further comprising:

executing a machine learning process to calculate the new size of the holding area based on the metadata of the first NVRAM variable.

12. A non-transitory computer-readable medium including code that when executed by a processor causes the processor to perform a method, the method comprising:

storing a plurality of non-volatile random access memory (NVRAM) variables and a basic input/output system (BIOS) in an NVRAM of a first information handling system, wherein the BIOS includes system BIOS variable services;

executing the system BIOS variable services;

determining whether a holding area of a first NVRAM variable of the NVRAM variables is completely used;

in response to the storage being completely used, calculating a new size of the holding area based on metadata of the first NVRAM variable; and creating a new storage area for the first NVRAM variable, wherein a size of a second holding area of the new storage area equals the new size;

determining whether a garbage collection operation is triggered;

in response to the garbage collection operation being triggered, collecting a NVRAM usage map;

creating a runtime data record of the NVRAM usage map;

providing the runtime data record of the NVRAM usage map to an operating system of the information handling system; and sending the runtime data record of the NVRAM usage map from the operating system to a cloud storage system.

13. The non-transitory computer-readable medium of claim 12, during a garbage collection operation, the method further comprises:

determining whether a usage of the second holding area satisfies a threshold usage; and in response to the second holding area satisfying the threshold usage, reformatting data in the second holding area to reduce the usage of the second holding area to a value below the threshold usage.

14. The non-transitory computer-readable medium of claim 13, wherein the reformatting of the data in the second holding maintains an enable/disable state of the first NVRAM variable.

15. The non-transitory computer-readable medium of claim 12, the method further comprising:

receiving a user log on at a second information handling system, wherein the user is associated with the first information handling system;

sending, from the cloud storage system, the NVRAM usage map to an operating system of the second information handling system;

determining whether the NVRAM usage map is newer than a second NVRAM usage map currently stored in a second NVRAM of the second information handling system;

in response to the NVRAM usage map being newer than the second NVRAM usage map, sending the NVRAM usage map to a second BIOS of the second information handling system; and applying, by the BIOS, the NVRAM usage map to second NVRAM of the second information handling system.

16. The non-transitory computer-readable medium of claim 12, wherein the metadata for the first NVRAM variable includes the size of the holding area, a waste index value, an increment count, and a decrement count.

17. The non-transitory computer-readable medium of claim 12, the method further comprising:

executing a machine learning process to calculate the new size of the holding area based on the metadata of the first NVRAM variable.

* * * * *